April 26, 1955 C. M. NICHOLSON 2,706,844
CELLULATION OF CLAY PRODUCTS
Filed Jan. 15, 1951 4 Sheets-Sheet 1

INVENTOR
C.M. NICHOLSON
BY
Jerome R. Cox

April 26, 1955   C. M. NICHOLSON   2,706,844
CELLULATION OF CLAY PRODUCTS
Filed Jan. 15, 1951   4 Sheets-Sheet 4

INVENTOR
C.M. NICHOLSON
BY
Jerome R. Cox

United States Patent Office 2,706,844
Patented Apr. 26, 1955

2,706,844

CELLULATION OF CLAY PRODUCTS

Clifford M. Nicholson, Columbus, Ohio, assignor to The Ohio State University Research Foundation, Columbus, Ohio, a corporation of Ohio Application January 15, 1951, Serial No. 206,000

16 Claims. (Cl. 25—156)

The invention disclosed in this application relates to new structural ceramic earth products and to methods of making them by firebloating.

An ideal and most desirable lightweight structural product for certain purposes should have the following characteristics: (1) small uniformly spaced cells in which preferably the average cell diameter does not exceed 0.1 to 1.0 mm.; (2) low bulk density in which the weight per cubic foot lies in the range of approximately from 20 to 60 pounds; (3) relatively high compressive strength of at least about 1500 p. s. i. and preferably lying between 1500 and 5000 p. s. i.; (4) low thermal conductivity; (5) large size units having accurate dimensions; (6) the quality of being easily cut, sawed or drilled; (7) good color and (8) economy in manufacture.

For use in structures which are exposed to the weather, it is also highly desirable that the product (9) have the cells sealed from each other so that the structure has the additional quality of being substantially impervious to penetration of water or vapors.

So far as we know there is at present no structural masonry product on the market having all the above combination of properties including impermeability. A lightweight cellular glass product has some of these properties but is notably lacking in the strength required for use in walls, is lacking in the colors desired and is also costly to manufacture. Lightweight cellular units made by cementing lightweight aggregates with Portland cement are naturally permeable to water and must be given additional treatment to overcome this deficiency. Lightweight structural units made by cellulating clay bodies by foaming, by chemical evolution of gases prior to firing, and by the burning out of combustibles have relatively low compressive strength and are permeable. Materials not impervious to water penetration cannot be classed as completely satisfactory for exterior use, inasmuch as in our climate, water penetration (by reason of alternate freezing and thawing) soon disintegrates any exposed material which is not so impervious. On the other hand for certain uses, it is desirable to produce structural units having the first eight qualities mentioned but which are subject to penetration by air, water, or vapors. For example, permeable units would be advantageous for sound insulation. Therefore, a new cellulated clay product having all of the good properties of cellulated glass would be welcome and one having in addition controlled sealing of the cells, adequate strength for structural purposes, good color and lower cost should fill a great need.

It is an object of this invention to produce a desirable light weight structural ceramic earth unit which has one or more of the following desirable properties, namely— uniformly spaced cells, low bulk specific gravity, high compressive strength, low thermal conductivity, good color and which is economical to manufacture, and it is a related object to provide a new and improved method for forming such structural units in which means are provided for controlling the permeability of the unit and wherein means are provided for forming the structural unit of prefired pellets and in which means are provided for the production of large cellular units by the fusion of smaller units together.

These and other objects and advantages of this invention will hereinafter appear and for purposes of illustration, but not of limitation, several embodiments of the processes and products of my invention are shown in the accompanying drawing in which—

Figure 1:
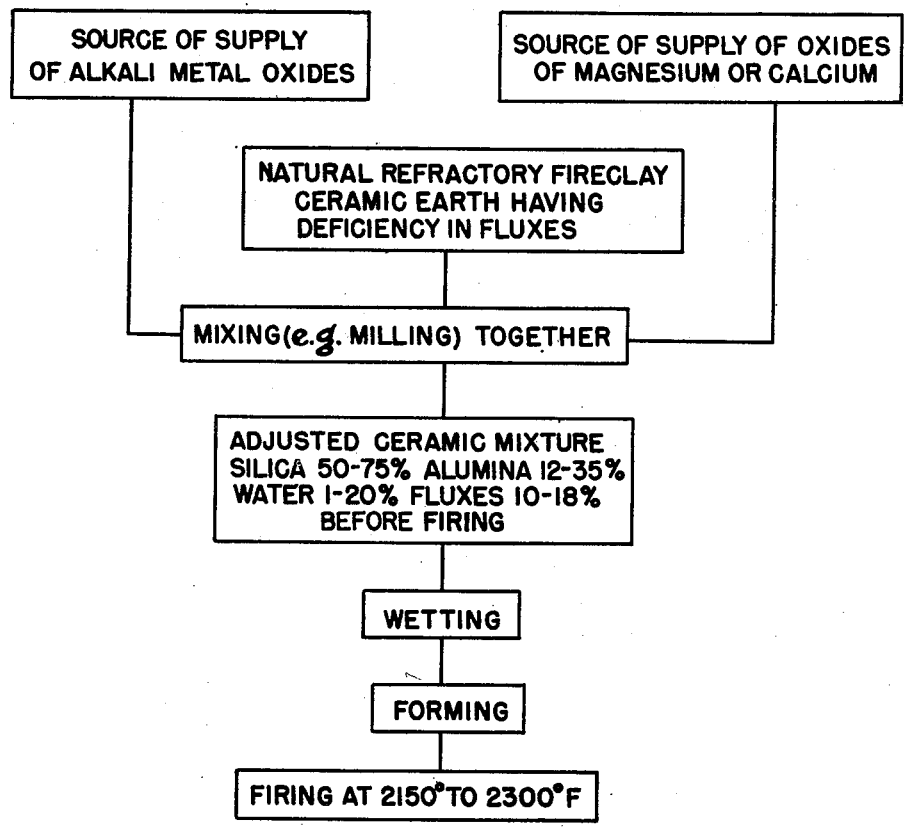
Figure 1 is a flow sheet showing one preferred embodiment of a process performed according to my invention.

I have discovered that a lightweight cellular structural unit having in high degree all of the above desirable qualities can be made by adjusting and firebloating certain ceramic earths including refractory clays. In making such structural units, natural clays may be adjusted in composition according to my invention or I may use novel mixtures of two or more such ceramic earths, novel mixtures of minerals and novel mixtures of oxides (or sources of oxides) adjusted in composition to the ranges which I have discovered to be desirable.

I have discovered that clays composed substantially of silica, alumina, chemically combined water and suitable fluxing oxides are satisfactory provided the proportions of the constituents are satisfactory. The fluxing oxides may consist of alkali metal oxides, alkaline earth oxides and the oxides of iron and titanium, or the fluxing oxides may be derived from alkali metal salts, alkaline earth metal salts and iron and titanium salts. For reasons of economy I usually prefer the oxides themselves or salts which are sources of such oxides such as the metal carbonates and/or metal silicates. However, any salts of the desired metals are satisfactory as sources of the metal oxides. Even though there is no oxygen present in the metal salt itself the oxide is formed when the clay is fired in the oxidizing atmosphere used. Such clays should however be adjusted so that the constituents are present in the ranges of silica 50 to 75%, alumina 12 to 35%, water 1 to 20% and fluxing oxides 10 to 18%. I prefer that the silica range from 50 to 65%, the alumina from 20 to 25%, and the fluxing oxides from 12 to 16%. In stating the percentages of the fluxing oxides in the last two sentences and in the claims, it should be understood that the percentage refers to the equivalent oxide and not to the salt from which the oxide is formed.

Moreover, my discoveries are useful in forming lightweight products which are also light in color. The color in fired clay products made from natural clays, etc. is due largely to the presence of iron compounds. If the clay is fired to a firebloated condition, the color is intensified and deepened because of increased glass formation and increased solution of iron. In order to obtain firebloated products light in color or even white it seems necessary to use materials that are low in iron content. Clays that are low in iron, constitute the white and buff burning clays. They are usually also low in other fluxing oxides and such clays are usually refractory and will not normally firebloat at least at any reasonable temperature. I have discovered that white and light colored lightweight cellular units can be made by adjusting the composition of white and buff burning refractory clays and similar materials.

I have also discovered a process of controlling the permeability of such products by controlling the sealing of the cells. I have produced products having the first eight qualities enumerated above as desirable, either having sealed cells or having communicating cells as desired. According to my invention, I utilize a firebloating process to obtain a proper combination of low bulk specific gravity and strength and I provide a properly balanced composition to control the sealing of the cells. I have discovered that the character of the cellulation of a firebloated product depends on the amount and properties of the glass formed during firing. The amount and properties of glass formed during firing in turn depend on the composition; both chemical and mineralogical of the raw batch ingredients. If the glass formed is low in viscosity and elasticity, gas will easily break through the cell walls and large intercommunicating cells will result. Also in such cases, much bloating takes place before the glass has time to dissolve non-glassy ingredients. On the other hand, if the glass is sufficiently viscous and elastic which condition may be brought about by sufficient dissolution of non-glassy ingredients, gas will not be able to perforate the cell walls and small, uniformly sized, non-communicating cells will result.

As a test whether the cells are communicating or non-communicating, I have used a 5-hour boiling test which will later be more fully described.

Experience has shown that the securing of sealed cells from natural earths is most difficult because either (1) it is practically impossible to find a single natural clay, shale, slate, silt or mineral having the proper composition which can be firebloated to obtain large structural units having the above desirable list of properties including the sealed cells and (2) when and if it is possible to do so, large deposits of a single raw material with uniform composition that will firebloat to provide large units having the desirable characteristics are exceedingly rare. The usual product resulting from firebloating clays is notable for communicating cells and high water absorption. I have discovered limits of desirable compositions that will firebloat to provide highly desirable products. In order to provide a non-communicating cellular structure the composition of the clay should contain fluxes within the ranges set out above, that is between 10 and 20% and preferably should be about 14%. Moreover, both magnesia and lime should be present because if either is absent or relatively low in proportion to other fluxes, open cells will result. Thus, I have discovered that in order to attain impermeability, there should be a preferred balance between lime and magnesia, and a preferred balance between the total of these two alkaline earth oxides and other fluxes including the alkali oxides such as sodium oxide and potassium oxide. The lime and magnesia should be present in quantities so that the ratio of these two oxides by weight varies not more than from 2 parts of lime to 1 part of magnesia to 1 part of lime to 2 parts of magnesia and preferably approximately 3 parts of lime to 2 parts of magnesia. The total of the lime and magnesia by weight should preferably be about half the total of the alkali oxides, and other fluxes such as iron oxide, etc. but may vary in ratios of from 1 to 1, to 1 to 4. If these two ranges of ratios (i. e. the ratio of lime to magnesia and the ratio of these two alkaline earths to other fluxes) are maintained within the total fluxes which total may itself vary in the range of from 10 to 20% of the total composition, a satisfactory noncommunicating cellular product may be obtained. I do not mean that all combinations of extremes within the ranges listed are satisfactory, but the extremes in one range must be compensated by variations in other ranges. Thus, the higher ranges of total fluxes require a high ratio of lime to magnesia. A high ratio of alkali metal oxides to alkaline earth oxides also requires a higher ratio of lime to magnesia. A lower range of total fluxes requires less lime, and more magnesia. Lower ranges of total fluxes and of magnesia require higher temperatures. Other unusual fluxes such as beryllium oxide and lithium oxide may so alter the balances in some degree that constituents outside of the ranges mentioned may be required.

I have thus discovered methods of adjusting natural clays, shales, slates and silts to produce compositions having the desirable qualities and I have demonstrated my discoveries by manufacturing new products which have these desirable characteristics from ceramic earths which naturally would not be suitable. In order to obtain my desired products, I control the composition of the ceramic material which I use. For example, if I desire impervious structural units, I provide a composition which is so balanced between lime and magnesia and between these alkaline earth oxides and the other fluxes and between the total fluxes and silica and alumina that it will liberate the bloating gases at a time when the pyroplasticity of the composition is such that the cells will be formed by the gases and yet the gases will not break through the cells and thus form communicating cells, it being understood that communicating cells increase the permeability and the water absorption of the product and that non-communicating cells decrease the permeability and prevent water absorption.

I have also discovered that when buff-burning fireclays are fluxed with $Na_2CO_3$ alone the resulting firebloated product has a darker color (brownish) and has communicating cells. When fluxed with $Na_2CO_3$ and $MgCO_3$ in proper proportions the firebloated product has a light color (grey) and has communicating cells. When fluxed with $Na_2CO_3$ and dolomite in proper proportions the firebloated product has a darker color (greenish) and has non-communicating cells.

Experience has shown that natural clays etc. including fireclays and other refractory clays, contain sufficient gas-evolving materials to cause firebloating providing they become pyroplastic with or without the addition of fluxes, at a reasonably low temperature. Such gas may be supplied from chemically combined water, carbon, carbonates, sulfides, sulfates and iron oxide. However, I am careful to remove most of these gas-forming elements including especially the carbon, by heating the ceramic material to about 1200° F. for a sufficiently long time before advancing the material to the firebloating temperature. Carbon bloating is not a large factor in my process. Most of the other materials mentioned above are removed from the clay by forming gaseous products during initial firing but sufficient material may be retained at the temperature of pyroplasticity to result in bloating. Ordinarily in prior art processes, carbon was considered an advantageous source of gas for bloating clays and shale in the manufacture of lightweight aggregate. However, I have found in forming large units, that if carbon is oxidized and removed from the surface but not from the interior of such a large size unit, it will bulge and distort badly when heated to a pyroplastic condition. Accordingly, in my processes I remove most if not all of the carbon before heating to the pyroplastic condition when firebloating large size units. This is accomplished by two methods. If the carbon content is low, it may be removed by oxidizing the units for sufficient time at a temperature of 1200°–1800° F. For appreciable quantities of carbon it is much more economical to roast or calcine the clay in a rotary kiln or multiple hearth roaster prior to forming into units for firebloating. This latter procedure has the double advantage of drying the raw clay and making possible very rapid firing of the units. These same procedures are useful also for removing other undesired bloating agents such as the sulfur compounds.

As stated above, I have found the desirable ranges of compositions of earths including the ranges of the contained fluxes whereby firebloated products may be produced. I have found that natural clays, etc., including fireclay and other refractory clays may be adjusted to these ranges. Often clays need additional fluxing oxides. Sometimes, however, a clay, etc. may be too high in fluxing oxides. In this event, I remove the excess by leaching the clay with water or dilute acids and subsequently adjust the dewatered clay as may be required for the product desired.

Referring to the drawings, it may be seen that in Fig. 1, I have illustrated a process wherein a natural ceramic earth is mixed with a source of supply of alkali metal oxides and a source of supply of oxides of magnesium and/or calcium to form an adjusted ceramic mixture which has a composition within my preferred ranges. The natural ceramic material here used may be as it is mined or it may have been pretreated by calcining as for example in rotary kiln or in a multiple hearth roaster. In this process the mixing is preferably performed by milling so that the material is ground at the same time that it is mixed and the material is subsequently wet and then formed in the shape desired and fired first at a temperature of about 1200° F. and then at a temperature from 2150° to 2300° F. to produce a desirable low density cellular ceramic product.

Figure 2:
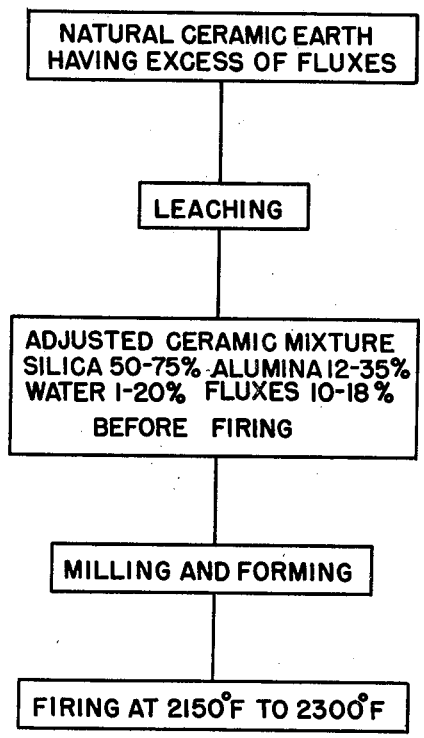
Figure 2 is a flow sheet showing another embodiment of a process of forming products according to my invention.

In Fig. 2 I have illustrated an embodiment of my process in which a natural ceramic earth is adjusted so that its composition falls within my preferred range by being leached to secure an adjusted ceramic mixture. Subsequently this adjusted ceramic mixture is dewatered and formed into units and then fired first at a lower temperature and then at 2150° F. to 2300° F. to produce a desirable low weight cellular ceramic product.

Figure 3:
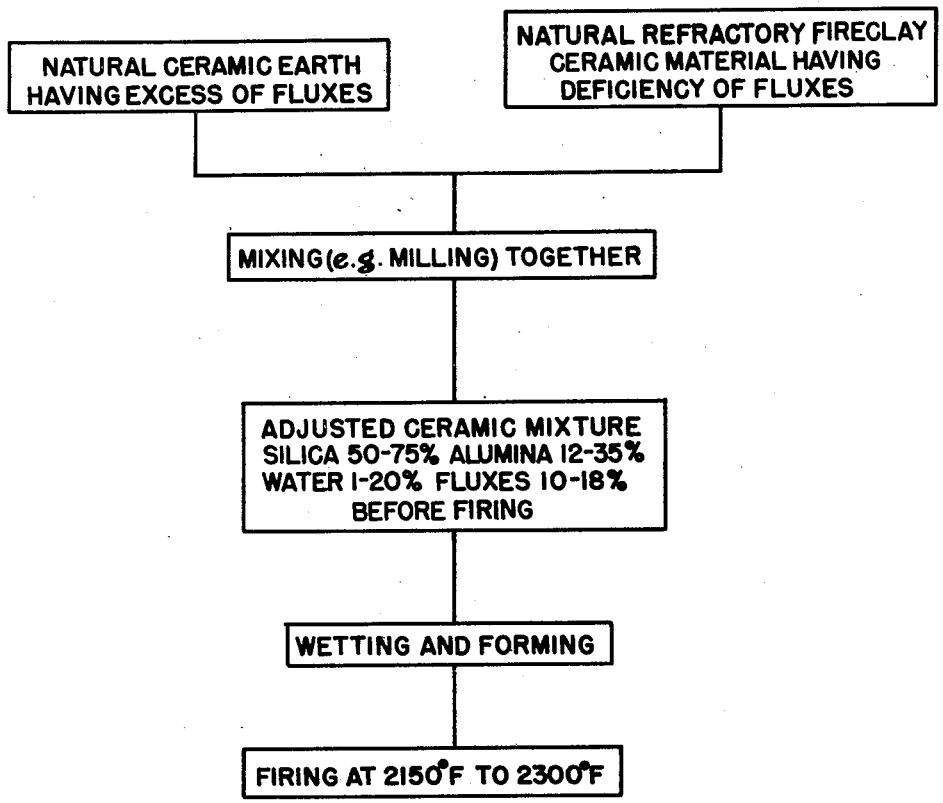
Figure 3 is a flow sheet showing still another embodiment of a process of forming such products.

In Fig. 3, I have illustrated an embodiment of my invention in which a composition falling within the range of my invention is obtained by mixing two natural earths neither of which may be wholly satisfactory for the desired purpose.

Figure 4:
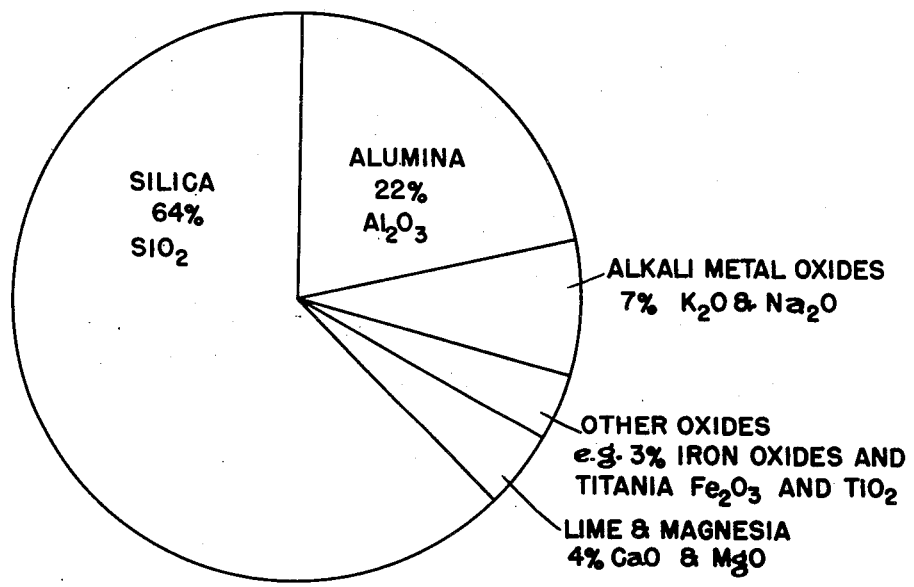
Figure 4 illustrates one preferred composition for use in the practice of this invention.
Figure 5:
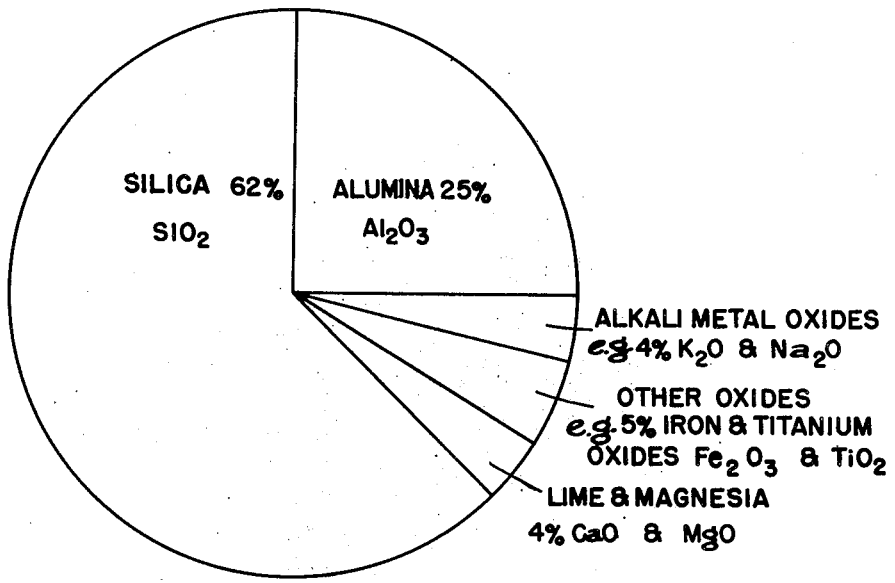
Figure 5 illustrates another preferred composition for use in the practice of this invention.

In Figs. 4 and 5, I have illustrated the compositions of two embodiments of my lightweight cellular structural units analyzed after firing.

Any of the processes illustrated in Figs. 1, 2 and 3 to secure an adjusted ceramic earth having the desired composition, or a combination of such processes, or other methods of securing such adjusted ceramic material may be availed of. Thereafter, the forming and the firing steps produce the desired novel and useful product.

Many buff-burning clays occurring in eastern Ohio, Pennsylvania, Indiana, and West Virginia including clays generally known as Lower Kittanning No. 4 and No. 5 fireclays, are relatively refractory clays and have a P. C. E. varying from cone 19 to 27 or higher (i. e. a relatively high temperature). This type of clay is widely used for the manufacture of a wide range of dense clay products including structural and facing tile. These clays generally do not bloat even when fired to a state of complete vitrification or glassiness. The following is a typical chemical analysis of Lower Kittanning No. 5 fireclay from East Canton, Ohio.

|  | Percent as Received | Percent After Ignition or Firing |
|---|---|---|
| Moisture at 105° C | 1.95 |  |
| Ignition Loss | 8.15 |  |
| $SiO_2$ (Silica) | 60.10 | 66.89 |
| $Al_2O_3$ (Alumina) | 24.40 | 27.17 |
| $Fe_2O_3$ (Ferric Oxide) | 2.15 | 2.39 |
| $TiO_2$ (Titania) | 0.70 | 0.78 |
| $P_2O_5$ (Phosphoric Oxide) | 0.01 | 0.01 |
| CaO (Lime) | 0.20 | 0.22 |
| MgO (Magnesia) | 0.04 | 0.04 |
| $K_2O$ (Potassium Oxide) | 1.57 | 1.75 |
| $Na_2O$ (Sodium Oxide) | 0.18 | 0.20 |
|  | 99.45 | 99.45 |
| C (Carbon) | 0.55 |  |
| $SO_3$ (Sulfuric Oxide) | 0.45 |  |

On the basis of 100 parts by weight, from 1 to 15 parts of dolomite were mixed with 6 parts $Na_2CO_3$ (sodium carbonate) and 93 to 79 parts of fireclay. Mixtures were also formulated in which dolomite was used to replace clay in bodies containing from 5 to 10 parts of $Na_2CO_3$. These bodies were fired to bloating temperatures and the properties of the cellulated products measured.

It was found that, when the bodies were fired to the proper maturing temperature, increased amounts of dolomite lowered the bulk specific gravity to 1.0 or less. The addition of dolomite lowered the absorption of the cellulated material to minimum values approaching 0. After reaching these minimum values, further increase in the amount of dolomite added, resulted in increasing bulk specific gravity or density. I found that additions of the following proportions are usable: from 5 to 10% sodium carbonate; from 4 to 10% of dolomite; and from 80 to 91% of fireclay. However, I found that the best combination for minimum values of bulk specific gravity and absorption, for the fireclays studied, were obtained when fireclay was replaced by 5% to 7% $Na_2CO_3$ and 7 to 9% dolomite. The preferred amounts of additions of sodium oxide from 2.9 to 4.1% may be derived from 5 to 7% of $Na_2CO_3$; of lime from 2.1 to 2.8%; and of magnesia from 1.4 to 1.9% (the lime and magnesia may be derived from 7 to 9% of dolomite). My products which were best as regards impermeability, low specific gravity, etc. had specific percentages of soda 3.5%; lime 2.5%; and magnesia 1.7%. These products had uniform, spherical, non-communicating cells. The color ranged from a medium greenish brown to a medium brownish green. The darker color is due to the increased state of solution of the iron and its state of oxidation.

While only fireclay, soda ash and dolomite are included in the above description, many other materials can be used to accomplish the same purpose. Other clays, shales, silts or aluminum-silicates (minerals high in alumina and silica) may be used in place of fireclay. Other materials can be used to supply the required amount of alkali, either $Na_2O$ or $K_2O$. For example dry powdered sodium silicate may be used to furnish the proper amount of $Na_2O$. Likewise other materials containing MgO, $Na_2O$, $K_2O$ and CaO can be used; for example magnesite, calcite, limestone, burnt dolomite, diopside, sericite, talc, sodalite and the like can be used to supply the required MgO, CaO, $Na_2O$, or $K_2O$. Soda ash and dolomite are favored because of availability and economy. The main requirement is that the final fired composition shall conform to the compositions which I have found to be satisfactory. In order to show that practical compositions could be made up synthetically without using natural earths I made compositions as follows:

| $SiO_2$: | | | |
|---|---|---|---|
| (from flint) | 61.10 | 52.49 | 55.43 |
| (from sodium silicate) |  | 8.61 | 5.67 |
| $Al_2O_3$ (from calcined alumina) | 24.78 | 24.78 | 24.78 |
| $Fe_2O_3$ (from iron oxide) |  |  | 2.18 |
| $TiO_2$ (from titania) |  |  | 0.72 |
| CaO (from calcium hydroxide) | 3.05 | 3.05 | 3.05 |
| MgO (from magnesium oxide) | 1.95 | 1.95 | 1.95 |
| $Na_2O$ (from soda ash) | 8.73 |  |  |
| $Na_2O$ (from sodium silicate) |  | 8.73 | 5.83 |
|  | 99.61 | 99.61 | 99.61 |

These bodies all firebloated when fired to 2250 to 2300° F. The fired properties of the all oxide body without iron and fluxed with sodium silicate were very close to the equivalent fireclay-dolomite body also fluxed with sodium silicate instead of soda ash. However, it is not to be expected that exactly the same fired properties will be obtained from fired compositions of the same chemical composition when derived from mixtures of different raw materials. Mineralogical as well as chemical compositions help to determine the properties of the product.

So far, I have explained to some extent the cause of cellulation during firebloating. In general, it is necessary for sufficient gas to be evolved at the same time and temperature at which the clay body becomes pyroplastic due to glass formation. Sufficient fluxes must be present to provide a glassy matrix of the proper elasticity and viscosity. Sufficient gas must be evolved to expand the plastic mass to the desired bulk specific gravity. The more points of gas generation, the better, because this provides cells with small diameter and thin cell walls. If there is insufficient gas pressure there will be insufficient bloating. If the glassy matrix is too fluid, slumping of the blown unit will result. If the glassy matrix is too brittle gas will break through the cell walls, provide communicating cells and result in a unit with high absorption.

Clays, shales, slates and silts commonly contain chemically combined water, carbonates, organic material (carbon), sulfates, sulfides, and iron oxide. All clays contain combined water. As these materials are heated, water vapor, oxides of carbon, oxides of sulfur and, under reducing conditions, oxygen, are evolved at various temperatures. No single gas is necessarily the best for the purpose, the main point being that the gas be evolved at the proper time and in the proper amount.

All normal particle size clays, ranging from 14-mesh to 200-mesh and finer may be used. It appears, however, that the finer the clay, the better it works.

I have found that if a ceramic earth has too little of the fluxing oxides, not only will excessively high and expensive temperatures be required to fire it, but at such temperatures, the earth fuses into a smooth material without cellulation. When it is too high in alkali fluxing oxides, it firebloats readily starting at a relatively low temperature but the cellulation produces communicating cells and absorption is relatively high. Bodies which are too high in total fluxing oxides will slump down during the first part of the cooling cycle.

Since soda ash is soluble in water, wet mixing and extrusion of the raw materials is impractical due to soda migration to the surface during the drying state. To avoid this difficulty, I may frit the soda ash with a sufficient portion of the raw batch to render it insoluble. I may then compound the fritted portion and mix it wet with the remainder of the batch materials. Also I use materials containing the alkalies in a chemically combined condition, such as sericite, sodalite, dry sodium silicate and the like to avoid the difficulty.

Instead of dry-pressing a blank unit of raw materials for placing on the firing hearth, the materials have been placed loose and dry in spaces provided by refractory separators and fired to produce good firebloated units.

The dry materials have been dampened with about 10% of water with and without binders (however always using binders with calcined materials) and rolled into pellets of graded size. A properly proportioned gradation of these pellets has been placed in the space provided by the separators and fired until bloated and fused into a large unit.

The methods of feeding dry powder or pellets into an enclosed space permit the manufacture of larger sized units than does the expansion of pressed units.

When firebloating a dry-pressed unit set flatwise on a hearth, the material at the center of the unit receives less heat than the material closer to the surface. There is a heat gradient from the surface to the center. Likewise there is a gradation of oxidation from surface to center, the material at the center being at the lowest state of oxidation. Since the most highly oxidized material is the most refractory and the most highly reduced material is the least refractory, the material at the center requires less heat than the material at the surface. Therefore, even bloating is obtainable with units up to a maximum practical size. I have shown by experiments that individual dry-pressed units can be set on the hearth at such a distance apart that when they firebloat, they expand to touch one another and fuse perfectly into a single large unit. This provides a method for making large finished units from either powder, pellets or relatively small formed units.

A firebloating mixture in the dry powder, pelletized and dry pressed form has been placed on prefired slabs of lightweight structural or refractory material and there fired. When fired to maturity a fused (or sandwich) unit was obtained wherein a lightweight, cellular, impermeable layer was tightly fused to a lightweight, cellular, permeable material. This combination unit is suitable for complete wall panels for both exterior and interior use.

A natural montmorillonitic clay from Texas has the following chemical composition:

|  | Percent as Received | Percent After Ignition or Firing | Percent Fluxing Oxide |
|---|---|---|---|
| Moisture at 105° C | 11.08 |  |  |
| Ignition Loss | 5.28 |  |  |
| $SiO_2$ (Silica) | 62.95 | 75.29 |  |
| $Al_2O_3$ (Alumina) | 15.48 | 18.51 |  |
| $Fe_2O_3$ (Ferric Oxide) | 0.97 | 1.16 | 1.16 |
| $TiO_2$ (Titania) | 0.15 | 0.18 | 0.18 |
| CaO (Lime) | 0.94 | 1.12 | 1.12 |
| MgO (Magnesia) | 1.99 | 2.38 | 2.38 |
| $K_2O$ (Potassium Oxide) | 0.32 | 0.38 | 0.38 |
| $Na_2O$ (Sodium Oxide) | 0.63 | 0.75 | 0.75 |
| C (Carbon) | 0.02 |  |  |
| $SO_3$ (Sulfuric Oxide) | 0.15 |  |  |
| $CO_2$ (Carbonate) | 0.02 |  |  |
| Total | 99.98 | 99.77 | 5.97 |

This clay is low in fluxing oxides (5.97% fired basis) and will not firebloat at any temperature up to 2700° F. (cone 18). At this temperature it fuses to a smooth white glassy material. However it firebloats readily at about 2200-2250° when fluxed with sericite or napheline syenite (and also with some natural clay shales and the like). When fired singly, nepheline syenite melts to a smooth glass without bloating at 2210° F. (cone 7) and the natural sericite does not firebloat until heated to about 2500° F. (cone 14). This indicates that the refractory montmorillonitic clay evolves enough gas at about 2150° to firebloat when sufficient fluxing oxides are provided by some other material.

A natural illitic clay from Illinois has the following chemical composition:

|  | Percent as Received | Percent After Ignition | Percent Fluxing Oxides |
|---|---|---|---|
| Moisture at 105° C |  |  |  |
| Ignition Loss | 7.20 |  |  |
| $SiO_2$ (Silica) | 51.94 | 55.92 |  |
| $Al_2O_3$ (Alumina) | 26.41 | 28.49 |  |
| $Fe_2O_3$ (Ferric Oxide) | 5.32 | 5.73 |  |
| $TiO_2$ (Titania) | 0.75 | 0.82 | 0.82 |
| CaO (Lime) | 1.21 | 1.30 | 1.30 |
| MgO (Magnesia) | 2.20 | 2.37 | 2.37 |
| $K_2O$ (Potassium Oxide) | 4.86 | 5.24 | 5.24 |
| $Na_2O$ (Sodium Oxide) | 0.42 | 0.45 | 0.45 |
| Total | 100.32 | 100.32 | 15.91 |
| C (Carbon) | 0.52 |  |  |
| $SO_3$ (Sulfuric Oxide) | 3.50 |  |  |
| $H_2O$ (Water Combined) | 6.67 |  |  |

This clay is high in fluxing oxides and also contains relatively large amounts of gas-evolving materials (carbon, sulfuric oxide and chemically combined water). It firebloats readily, starting at about 2125° F. (cone 3) but the product is not satisfactory with normal firing. When fired in large units it must be held a long time at 1200–1800° F. under oxidizing conditions to remove the large amounts of carbon and sulfur. If this is not done, excessive bulging and black coring results. It has been found beneficial to pre-calcine this clay to 1200–1800° F. before forming into units for firebloating. This will be described more in detail later.

Neither the montmorillonitic clay from Texas nor the illitic clay from Illinois firebloat satisfactorily alone without modification but when mixed in the ratio of 3 parts by weight of the former and 7 parts of the latter, the mixture bloats perfectly. The chemical composition of the mixture is as follows:

|  | Percent as Received | Percent After Firing | Percent Fluxing Oxides |
|---|---|---|---|
| Moisture at 105° C |  |  |  |
| Ignition Loss | 6.82 |  |  |
| $SiO_2$ (Silica) | 57.52 | 61.75 |  |
| $Al_2O_3$ (Alumina) | 23.73 | 25.45 |  |
| $Fe_2O_3$ (Ferric Oxide) | 4.05 | 4.35 | 4.35 |
| $TiO_2$ (Titania) | 0.58 | 0.62 | 0.62 |
| CaO (Lime) | 1.16 | 1.24 | 1.24 |
| MgO (Magnesia) | 2.18 | 2.35 | 2.35 |
| $K_2O$ (Potassium Oxide) | 3.52 | 3.76 | 3.76 |
| $Na_2O$ (Sodium Oxide) | 0.50 | 0.54 | 0.54 |
|  | 100.06 | 100.06 | 12.86 |

Following are examples of my processes:

Example 1

A batch consisting of 6 parts by weight of soda ash ($Na_2CO_3$), 8 parts dolomite from Woodville, Ohio, and 86 parts Lower Kittanning No. 5 fireclay from East Canton, Ohio, was dry milled to provide an intimate mixture of 100-mesh fineness. Water equal to 5% of the dry batch was added to and blended with the batch in a Simpson mixer. The damp mixture was passed through a 14-mesh sieve and formed into a 2½" x 4¾" x 9½" units by pressing in a hydraulic press using a pressure of 500 p. s. i. The dry-pressed units were placed on silicon carbide slabs and using coarse silica sand as a parting agent. Then strips of lightweight refractory ½" x 4" high, set on edge and ½" from the sides and ends, were placed between the units to permit expansion and act as separators. The units were fired in an oxidizing atmosphere until all carbon was removed from the body and the units had expanded to fill the spaces provided by the separators. The temperature was brought rapidly to 1200° F. and held between 1200 and 1400° F. until all carbon was oxidized. The temperature was then raised to 2265° F. or cone 9 down at which point the unit was properly expanded and cellulated. The unit was then permitted to cool to room temperature. After cooling and removal of the separators, the units were trimmed to accurate dimensions with masonry saws.

The following are some physical properties of the fired units: Color—medium greenish brown. Cellulation—uniform, spherical non-communicating cells; average diameter 0.8 mm. Volume increase 43%. Apparent porosity 2.35%. Absorption (5 hr. boil) 2.59%. Bulk specific gravity 0.91 (density 56.8 lbs. per cu. ft.); compressive strength 4500 p. s. i. Trimmings 13.3%.

Example 2

Batch:
  7 parts by weight of soda ash ($Na_2CO_3$)
  7 parts dolomite from Woodville, Ohio
  86 parts Lower Kittanning No. 5 fireclay from East Canton, Ohio Milled batch was 80% of the above raw batch and 20% of previously firebloated trimmings of the same composition.

Milling, forming and firing procedure the same as for Example 1, except that 6% tempering water was added to the milled dry mix and the firebloating maturing temperature was 2230° F. or cone 8 down.

The following are some of the physical properties of the fire units: Color—medium brownish green. Cellulation—spherical non-communicating cells. Apparent porosity 1.33%. Absorption (5 hr. boil) 1.33%. Bulk specific gravity 0.999 (density 62.3 lb. per cu. ft.); compressive strength 4650 lbs. per sq. in.

*Example 3*

Batch:
    5 parts by weight of soda ash ($Na_2CO_3$)
    9 parts dolomite from Woodville, Ohio
    86 parts Lower Kittanning No. 5 fireclay from Minerva, Ohio Milling, forming and firing procedure the same as for Example 1, except that the firebloating maturing temperature was 2310° F. or cone 10 down.

The following are some of the fire properties of the fire units: Color—medium brown. Cellulation—spherical, non-communicating cells. Apparent porosity 1.75%. Absorption (5 hr. boil) 1.88%. Bulk specific gravity 0.93 (density 58 lbs. per cu. ft.); compressive strength 2000 p. s. i.

*Example 4*

A typical illitic clay from Grundy County, Illinois, containing the clay mineral illite as a major constituent was pulverized and roasted at 1800° F. for 2 hours to remove excess carbon and sulfur. The calcine was tempered with water and dextrin equal to 6% and 1% by weight respectively of the calcine by mixing in a Simpson mixer and passing the mixture through a 14-mesh sieve. The damp mixture was formed into 2½" x 4¾" x 9½" units in a hydraulic press using a forming pressure of 310 p. s. i. The dry-pressed units were placed on silicon carbide slabs without side supports. Silicon carbide grain was used as a parting agent. The units were then fired to 2275° F. (cone 9) in 8 hours. They firebloated uniformly and maintained their rectangular shapes exceptionally well. After cooling slowly to room temperature the units were trimmed to accurate dimensions with masonry saws.

The following are some of the physical properties of the fired units: Color: dark brown mottle. Cellulation: uniform communicating cells. Diameter 0.05 to 2.0 mm. Volume increase 53.6%. Apparent porosity 43.9%. Absorption (5 hr. boil) 50.4% (24 soak test 7.24%). Bulk specific gravity 0.87 (density 54.3 lbs. per cu. ft.).

*Example 5*

I mixed a montmorillonitic clay, a natural muscovite type mica and soda ash in proportions of clay 50%, mica 45%, and soda ash 5%. I molded into units and fired. The product weights 68 lbs. per cu. ft., was a light greenish gray color and had uniform cellulation with non-communicating cells. The product was substantially impervious to water as shown by a five hour boil test.

*Example 6.—Improving bloating clay by leaching out fluxes*

Unweathered montmorillonitic shale from Kentucky was found to firebloat at about 2125° F. (cone 2–3) yielding a product with coarse, uneven, communicating cells. The product was permeable to water.

The unweathered shale was then leached with a solution consisting of 1 part by volume of hydrochloric acid and 4 parts of water. After decanting off the acid solution and further washing of the clay with water the clay was dewatered and formed into trial specimens and large units.

These specimens and units when fired to 2240° F. (cone 8) were found to firebloat to yield products having fine, uniform, non-communicating cells.

It is to be understood that the above described embodiments are for the purpose of illustration only and various changes may be made therein without departing from the spirit and scope of the claims which follow.

I claim:

1. In a process of manufacturing a lightweight cellular structure, the step of firing a ceramic earth material consisting of from 50 to 75% by weight silica, from 12 to 35% by weight alumina, from 1 to 20% by weight chemically combined water and from 10 to 20% by weight of fluxing oxides present in fluxes selected from the group of fluxes consisting of the alkali metal oxides, the alkaline earth metal oxides, the oxides of iron and titanium, the alkali metal salts which are sources of the alkali metal oxides, the alkaline earth metal salts which are sources of alkaline earth metal oxides, and the salts of iron and titanium which are sources of oxides of iron and titanium, to a temperature of from 2150° F. to 2300° F. and in which magnesium and calcium oxides are present as alkaline earth metal oxides in amounts ranging from 1 part by weight of the magnesium and calcium oxides to 1 to 4 parts by weight of the fluxing oxides and in which the ratio of magnesium oxide to calcium oxide is in the range of 1 part by weight magnesium oxide to ½ to 2 parts by weight calcium oxide.

2. In a process of manufacturing a lightweight cellular structure, the steps of firing a mixture of from 85 to 99 parts by weight of a ceramic earth material consisting essentially of from 50 to 75% by weight silica, from 12 to 35% by weight alumina, from 1 to 20% by weight of chemically combined water and from 0 to 15% by weight of fluxing oxides present in combined fluxes with from 1 to 7 parts by weight sodium carbonate and 1 to 9 parts by weight of the oxides of magnesium and calcium, the oxides of magnesium and calcium being present in the combined mixture in the ratio of 1 part by weight of the magnesium and calcium oxides to 1 to 4 parts by weight of the fluxing oxides and in which the magnesium and calcium oxides are present in the ratio of 1 part by weight of magnesium oxide to ½ to 2 parts by weight of calcium oxide to a temperature of from 2150° F. to 2300° F., and reducing the size of the particles of said total mixture to a size of from 14-mesh to 200-mesh prior to firing.

3. In the process of manufacturing a lightweight cellular structure, the steps of forming a composition consisting of from 5 to 7 parts by weight of sodium carbonate with from 7 to 9 parts by weight of dolomite, fritting said mixture, reducing said fritted material to particles of 14–200 mesh mixing said fritted particles with from 84 to 88 parts by weight of a ceramic earth material having from 50 to 65% by weight silica, from 20 to 30% by weight alumina, less than 1% by weight of oxides of calcium and magnesia, and less than 2% by weight of alkali metal oxides, the dolomite being a natural mixed carbonate of magnesium oxide and calcium oxide and containing from 15 to 25% by weight magnesium oxide, and from 25 to 35% by weight calcium oxide.

4. In a process of manufacturing a lightweight cellular structure, the steps of mixing a ceramic earth material having from 50 to 75% by weight silica, from 12 to 35% by weight alumina, from 1 to 20% by weight chemically combined water and less than 8% by weight of fluxing oxides present in combined fluxes with a ceramic earth having from 50 to 75% by weight silica, 12 to 35% by weight alumina and from 15 to 20% by weight of oxides of alkali metals and of calcium and magnesium in which the calcium and magnesium oxides are present in the ratio of 1 part by weight calcium and magnesium oxide to 1 to 4 parts by weight of the oxides of alkali metals and in which the calcium and magnesium oxides are present in the ratio of 1 part by weight of magnesium oxide to ½ to 2 parts by weight calcium oxide, and firing to a temperature of from 2150° F. to 2300 °F.

5. In the process of manufacturing a lightweight cellular structure, the steps of mixing from 84 to 88 parts by weight of a ceramic earth material having from 50 to 65% by weight silica, from 20 to 30% by weight alumina, less than 1% by weight of oxides of calcium and magnesia in which the calcium oxide and magnesia are present in the ratio of 1 part by weight magnesia to ½ 2 parts by weight of calcium oxide, and less than 2% by weight of alkali metal oxides with from 5 to 7 parts by weight of sodium carbonate and with from 7 to 9 parts by weight of dolomite, the dolomite being a natural mixed carbonate of magnesium oxide and calcium oxide and containing from 15 to 25% by weight magnesium oxide and from 25 to 35% by weight calcium oxide, and firing to a temperature of from 2150° F. to 2300° F.

6. An article of manufacture comprising a fired light weight cellular structure unit having a fired composition consisting essentially of from 50 to 65% by weight silica, from 20 to 25% by weight alumina, a total from 4 to 6% by weight of lime and magnesia combined, present in the ratio of 1 part by weight magnesia to ½ to 2 parts by weight of lime, and a total from 5 to 14% by weight of alkali metal oxides, having a weight per cubic foot lying between 20 and 63 pounds, having a compressive strength lying between 800 and 5000 pounds per square inch, being substantially impervious to the penetration of water vapors, having a low thermal conductivity, good color, and being economical to manufacture.

7. An article of manufacture comprising a fired lightweight cellular structural unit having a fired composition consisting essentially of from 50 to 70% by weight silica, from 14 to 35% by weight alumina, a total from 4 to 6% by weight of lime and magnesia combined, present in the ratio of 1 part by weight magnesia to ½ to 2 parts by weight of lime, and a total from 5 to 14% by weight of alkali metal oxides.

8. A process of manufacturing a lightweight cellular structure which consists of reducing a ceramic earth material to provide a composition consisting of a clay mixture having from 50 to 75% by weight silica, from 12 to 35% by weight alumina, from 1 to 20% by weight chemically combined water and from 10 to 20% by weight of fluxing oxides including calcium oxide and magnesium oxide in which calcium oxide and magnesium oxide are present in a percentage of the total mixture of from 2 to 6% by weight and in an approximate weight ratio to each other of about 3 to 2, respectively, to a particle size ranging from 200-mesh to 14-mesh, dampening, forming, preheating to a temperature of about 1200° F. for a period of time to oxidize any carbon present and drive off excess gases, and firing to a temperature of from 2150° F. to 2300° F.

9. In a process of manufacturing a lightweight cellular structure, the step of firing a ceramic earth material consisting of from 50 to 75% by weight silica, from 12 to 35% by weight alumina, from 1 to 20% by weight chemically combined water and from 10 to 20% by weight of fluxing oxides including magnesium oxide and calcium oxide in which the ratio of the total of the oxides of magnesium and calcium to all of the other fluxes is in the range of 1/4 to 1/1 parts by weight and in which the ratio of the magnesium oxide to the calcium oxide is in the range of 2/1 to 1/2 parts by weight, to a temperature of from 2150° F. to 2300° F.

10. In a process of manufacturing a lightweight cellular structure, the step of firing a ceramic earth material consisting of from 50 to 75% by weight silica, from 12 to 35% by weight alumina, from 1 to 20% by weight chemically combined water and from 10 to 20% by weight of fluxing oxides including alkali metal oxides and oxides of magnesium and calcium in which the ratio of total of alkali metal oxides to the total of the oxides of magnesium and calcium is in the range of 1/1 to 4/1 to a temperature of from 2150° F. to 2300° F. and in which the magnesium and calcium oxides are present in the ratio of 1 part by weight magnesium oxide to ½ to 2 parts by weight of calcium oxide.

11. In a process of manufacturing a lightweight cellullar structure, the step of firing a ceramic earth material having an excess of carbon to a temperature of from 2150° F. to 2300° F., in which the ceramic earth material consists of from 50 to 75% by weight silica, from 12 to 35% by weight alumina, from 1 to 20% by weight chemically combined water and from 10 to 20% by weight of fluxing oxides including calcuim and magnesium oxides present in the ration of 1 part by weight of the calcium and magnesium oxides to 1 to 4 parts by weight of the fluxing oxides and in which the calcium and magnesium oxides are present in the ratio of 1 part by weight of magnesium oxide to ½ to 2 parts by weight of calcium oxide.

12. A process of manufacturing a lightweight cellular structure which comprises reducing a ceramic earth material consisting of from 50 to 75% by weight silica, from 12 to 35% by weight alumina, from 1 to 20% by weight chemically combined water and from 10 to 20% by weight of fluxing oxides including calcium and magnesium oxides present in the ratio of 1 part by weight magnesium oxide to ½ to 2 parts by weight calcium oxide to a particle size ranging from 14-mesh to 200-mesh and in which the calcium and magnesium oxides are present in the ratio of 1 part by weight thereof to 1–4 parts by weight of the fluxing oxides, dampening, forming in a plurality of blocks, and firing a plurality of said blocks adjacent to each other without refractory separators to a temperature of 2150° F. to 2300° F. so that as the structure is heated and swells, the plurality of blocks fuse to each other to form a larger block.

13. A process of manufacturing a lightweight cellular structure which comprises reducing a mixture of ceramic material consisting of from 50 to 75% by weight silica, from 12 to 35% by weight alumina, from 1 to 20% by weight chemically combined water and from 10 to 20% by weight of fluxing oxides, including calcium and magnesium oxides in the ratio of 1 part by weight calcium and magnesium oxides to 1 to 4 parts by weight of the fluxing oxides and in which the calcium and magnesium oxides are present in the ratio of 1 part by weight of magnesium to ½ to 2 parts by weight of calcium oxide to a particle size ranging from 200-mesh to 14-mesh, dampening, rolling into pellets, placing in a firing zone provided with refractory separators, and firing to a temperature of from 2150° F. to 2300° F. to bloat and fuse into cellulated units.

14. A process of manufacturing a lightweight cellular structure which comprises reducing a ceramic earth material consisting of from 50 to 75% by weight silica, from 12 to 35% by weight alumina, from 1 to 20% by weight chemically combined water and from 10 to 20% by weight of fluxing oxides including calcium and magnesium oxides in the ratio of 1 part by weight calcium and magnesium oxides to 1 to 4 parts by weight of the fluxing oxides and in which the calcium and magnesium oxide are present in the ratio of 1 part by weight of magnesium to ½ to 2 parts by weight of calcium oxide to a particle size ranging from 200-mesh to 14-mesh, dampening, forming, and firing to a temperature of from 2150° F. to 2300° F.

15. In a process of manufacturing a lightweight cellular structure, the steps of reducing a mixture of ceramic material consisting of from 50 to 75% by weight silica, from 12 to 35% by weight alumina, from 1 to 20% by weight chemically combined water and from 10 to 20% by weight of fluxing oxides containing calcium and magnesuim oxides present in the ratio of 1 part by weight magnesium oxide to ½ to 2 parts by weight calcium oxide by leaching out fluxes from a natural earth having an excess thereof to a particle size ranging from 200-mesh to 14-mesh, and firing to a temperature of from 2150° F. to 2300° F.

16. In a process of manufacturing a lightweight cellular structure, the steps of reducing from 80 to 99 parts by weight of a ceramic earth material consisting of from 50 to 75% by weight silica, from 12 to 35% by weight alumina, from 1 to 20% by weight chemically combined water and from 1 to 15 parts by weight of fluxing oxides containing calcium and magnesium oxide present in the ratio of 1 part by weight of the calcium and magnesium oxides to 1 to 4 parts by weight of the fluxing oxides and in which the calcium and magnesium oxides are present in the ratio of 1 part by weight magnesium oxide to ½ to 2 parts by weight of calcium oxide, and firing to a temperature of from 2150° F. to 2300° F.

References Cited in the file of this patent

UNITED STATES PATENTS

| Number | Name | Date |
|---|---|---|
| 46,578 | Nichols et al. | Feb. 28, 1865 |
| 49,272 | Hursh et al. | Aug. 8, 1865 |
| 1,108,007 | Ribbe | Aug. 18, 1914 |
| 1,845,350 | Slidell et al. | Feb. 16, 1932 |
| 1,944,007 | Hobart | Jan. 16, 1934 |
| 1,963,029 | Powell | June 12, 1934 |
| 2,046,071 | Harding | June 30, 1936 |
| 2,073,138 | Bole | Mar. 9, 1937 |
| 2,103,746 | Guth | Dec. 28, 1937 |
| 2,171,290 | Hobart | Aug. 29, 1939 |
| 2,297,539 | Diamond | Sept. 29, 1942 |
| 2,303,964 | Ungewiss | Dec. 1, 1942 |
| 2,400,087 | Harth | Mar. 14, 1946 |
| 2,485,724 | Ford | Oct. 25, 1949 |

FOREIGN PATENTS

| Number | Country | Date |
|---|---|---|
| 8,958 | Great Britain | 1913 |